(12) United States Patent
McCoy

(10) Patent No.: US 8,180,009 B2
(45) Date of Patent: May 15, 2012

(54) TECHNIQUES FOR SIGNALING REFERENCE SIGNAL PARAMETERS IN A WIRELESS COMMUNICATION SYSTEM

(75) Inventor: James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 1226 days.

(21) Appl. No.: 11/935,242

(22) Filed: Nov. 5, 2007

(65) Prior Publication Data

US 2009/0116599 A1   May 7, 2009

(51) Int. Cl.
  *H04L 7/04*   (2006.01)
(52) U.S. Cl. ...... 375/362; 375/296; 375/310; 455/562.1
(58) Field of Classification Search ............. 375/362
  See application file for complete search history.

(56) References Cited

U.S. PATENT DOCUMENTS

| 7,423,988 B2 * | 9/2008 | Hedin et al. | 370/322 |
| 7,535,819 B1 * | 5/2009 | Larsson et al. | 370/208 |
| 2008/0101507 A1 * | 5/2008 | Oketani et al. | 375/343 |
| 2009/0042615 A1 * | 2/2009 | Teo et al. | 455/562.1 |
| 2009/0109906 A1 * | 4/2009 | Love et al. | 370/329 |
| 2009/0196370 A1 * | 8/2009 | Cheng et al. | 375/267 |

* cited by examiner

*Primary Examiner* — Shuwang Liu
*Assistant Examiner* — Lihong Yu
(74) *Attorney, Agent, or Firm* — Gazdzinski & Associates, PC

(57) ABSTRACT

A technique for operating a wireless communication device includes assigning a reference signal bandwidth to a reference signal. Cyclic shift control bits (associated with the reference signal) are then allocated based on the assigned reference signal bandwidth. The allocated cyclic shift control bits specify a cyclic shift associated with the reference signal.

21 Claims, 4 Drawing Sheets

200

| WB | CS | | |||||||
|----|----|----|---|---|---|---|---|---|---|
| NB | CS | HP | | | | | | | |
| | 0 | 0 | 0 | 0 | 0 | 1 | 1 | 1 | 1 |
| | | 0 | 0 | 1 | 1 | 0 | 0 | 1 | 1 |
| | | 0 | 1 | 0 | 1 | 0 | 1 | 0 | 1 |

FIG. 2

TECHNIQUES FOR SIGNALING REFERENCE SIGNAL PARAMETERS IN A WIRELESS COMMUNICATION SYSTEM

BACKGROUND

1. Field

This disclosure relates generally to reference signals and, more specifically, to techniques for signaling reference signal parameters in a wireless communication system.

2. Related Art

In general, orthogonal frequency division multiplexing (OFDM) systems support high data rate wireless transmission using orthogonal channels. Typically, OFDM systems split data into N streams, which are independently modulated on parallel spaced subcarrier frequencies or tones. The frequency separation between subcarriers is 1/T, where T is the OFDM symbol time duration. Each symbol may include a guard interval (or cyclic prefix) to maintain the orthogonality of the symbols. Usually, OFDM systems have utilized an inverse discrete Fourier transform (IDFT) to generate a sampled (or discrete) composite time-domain signal.

At least some wireless communication systems have used an estimated received signal strength and an estimated carrier to interference and noise ratio (CINR) of a received signal to determine operational characteristics of the systems. As one example, IEEE 802.16e compliant mobile stations are required to estimate a received signal strength indicator (RSSI) and a CINR of a received signal. In general, CINR at a mobile station (MS) may be calculated as the ratio of an RSSI of a serving base station (BS) to summed RSSIs of non-serving BSs added to a white noise power of a receiver of the MS. The RSSI associated with a serving BS may be used by an MS for uplink power control and the CINR, which is reported to a serving BS, may be used by the serving BS to adapt a downlink (DL) transmission rate to link conditions.

Accurate reported CINRs are usually desirable, as inaccurate reported CINRs may impact performance of a wireless network. For example, reporting a CINR that is above an actual CINR may decrease network throughput due to frame re-transmission, while reporting a CINR that is below the actual CINR may cause the serving BS to schedule data rates below a supportable data rate. According to IEEE 802.16e, RSSI and CINR estimates at an MS are derived based on a preamble signal, which is an orthogonal frequency division multiple access (OFDMA) symbol that is transmitted at the beginning of each OFDMA frame.

Similarly, wireless networks that employ third-generation partnership project long-term evolution (3GPP-LTE) compliant architectures employ uplink (UL) reference signals (RSs), which are scheduled to user equipment (subscriber stations (SSs)) within a 3GPP-LTE communication system. Respective sequences of the RSs are used to uniquely identify an SS and, when transmitted from the SS to a serving base station (BS), may be used by the serving BS in channel estimation and channel assignment. The RS sequences may be created through a number of different techniques.

As currently agreed, 3GPP-LTE compliant BSs are configured to signal a number of associated channel sounding control bits (to SSs) on a physical downlink control channel (PDCCH). The SSs decode the channel sounding control bits to determine an appropriate channel sounding RS for transmission. The channel sounding control bits may specify parameters such as a bandwidth (BW), a cyclic shift (CS), and a hopping pattern (HP), among other signal characteristics, to designate a particular channel sounding RS for transmission from a given SS. As currently agreed, 3GPP-LTE compliant systems employ the same number of channel sounding control bits to specify a CS of a channel sounding RS, irrespective of an associated channel sounding bandwidth.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a table of example cyclic shift (CS) control bit assignments for a WB channel sounding RS and an NB channel sounding RS, according to one embodiment of the present disclosure.

DETAILED DESCRIPTION

Figure 1:
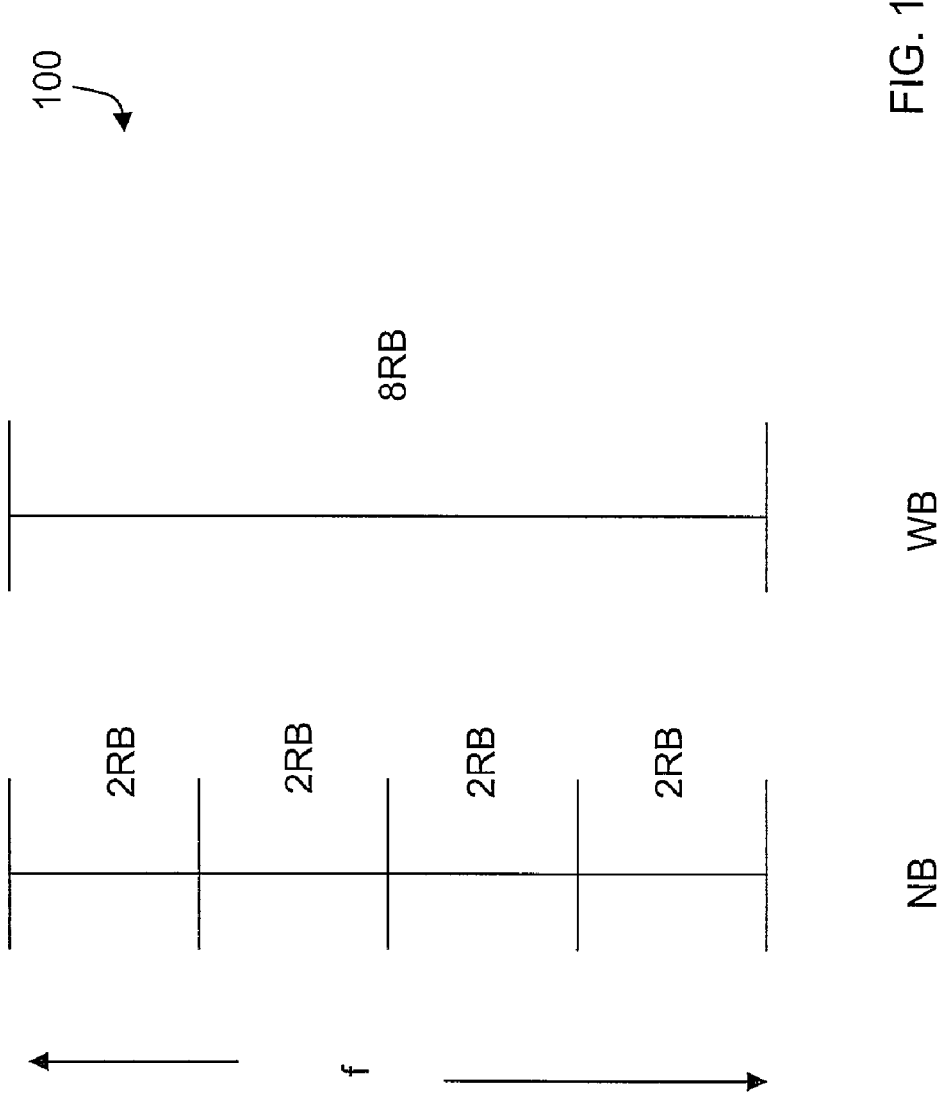
FIG. 1 is a diagram of example channel sounding reference signal (RS) assignments for a wide-bandwidth (WB) channel sounding RS and a narrow-bandwidth (NB) channel sounding RS.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although one embodiment is described below with respect to a wireless communication device that takes the form of a mobile telephone, it will be appreciated that the present invention is not so limited and may have application to other embodiments of electronic devices such as personal digital assistants (PDAs), digital cameras, portable storage devices, audio players, computer systems, and portable gaming devices, for example, that also include circuitry that comprises a mobile telephone.

As noted above, according to current agreements, a 3GPP-LTE compliant architecture utilizes the same number of channel sounding control bits to specify a cyclic shift (CS) of a channel sounding reference signal (RS) irrespective of an associated channel sounding bandwidth. In this case, a narrow-bandwidth (NB) channel sounding RS has the same number of CS bits as a wide-bandwidth (WB) channel sounding RS. However, in this case, due to the spread of a channel sounding waveform in the time-domain, the number of CSs for an NB channel sounding RS may be over-provisioned and the number of CSs for a WB channel sounding RS may be under-provisioned. That is, a height of an RS waveform in the time-domain is proportional to the number of assigned resource blocks (RBs), while a width of an RS waveform in the time-domain is inversely proportional to the number of assigned RBs. For example, a waveform for an RS that is assigned eight RBs has a relatively large height and a relatively narrow width in the time-domain. In contrast, a waveform for an RS that is assigned two RBs has a relatively small height and a relatively large width in the time-domain.

Due to the large width associated with NB RSs in the time-domain, fewer NB RSs can be assigned to SSs without inter-symbol interference (ISI). For example, assuming two CS control bits are employed, four orthogonal RSs may be specified by the two CS control bits. However, due to potential ISI, the number of orthogonal RSs that may be specified by the two CS control bits may be less than four RSs. As one example, only two orthogonal RSs may be assigned for NB RSs without ISI, even though four RSs may be specified with the two CS control bits. In contrast, as another example, eight orthogonal RSs may be assigned for WB RSs without ISI, even though only four RSs may be specified with the two CS control bits. According to various aspects of the present disclosure, channel sounding control bits may be reallocated to specify additional cyclic shifts for WB RSs. For example, one or more control bits that are used to signal a hopping pattern (HP) may be reallocated to specify CSs based on RS bandwidth. As one example, a wireless communication system that employs two control bits to specify a CS and one control bit to specify an BP for an NB RS may employ three control bits (i.e., the original two control bits for the CS and the one control bit for the HP) for a WB RS. While the discussion herein is directed to signaling CSs with two control bits and HPs with one control bit, it should be appreciated that the techniques disclosed herein are broadly applicable to systems that employ more than two CS control bits and more than one HP control bit.

As is used herein, the terms "wide-bandwidth" and "narrow-bandwidth" are relative terms with a "wide-bandwidth" RS having more assigned resource blocks than a "narrow-bandwidth" RS. As is also used herein, the term "subscriber station" is synonymous with the term "user equipment," which includes a wireless communication device that may (or may not) be mobile. As used herein, the term "channel" includes one or more subcarriers, which may be adjacent or distributed across a frequency band. The term, resource block, as used herein, includes a number of subcarriers (e.g., twelve subcarriers) which may or may not be adjacent.

According to various aspects of the present disclosure, a technique for operating a wireless communication device (e.g., a base station) includes assigning a reference signal bandwidth to a reference signal (RS). Cyclic shift control bits (associated with the RS) are then allocated based on the assigned reference signal bandwidth. The allocated cyclic shift control bits specify a cyclic shift associated with the RS.

According to another embodiment of the present disclosure, a technique for operating a wireless communication device includes receiving, at a subscriber station, a reference signal bandwidth assignment for a reference signal. A cyclic shift assignment for the reference signal is also received at the subscriber station. The cyclic shift assignment is specified by cyclic shift control bits whose number is based on the reference signal bandwidth assignment. In this case, the cyclic shift control bits specify an assigned cyclic shift for the reference signal.

According to yet another aspect of the present disclosure, a wireless communication device includes a scheduler that is configured to assign a reference signal bandwidth to a reference signal. The scheduler is also configure to allocate cyclic shift control bits (that are associated with the reference signal) based on the assigned reference signal bandwidth. The allocated cyclic shift control bits specify a cyclic shift associated with the reference signal.

It should be appreciated that the techniques disclosed herein are broadly applicable to signaling parameters for RSs in general (i.e., the techniques disclosed herein may be generally applicable to other RSs, e.g., demodulation RSs). As used herein, the term "demodulation RS" means an RS that is assigned to (and transmitted by) an SS, received by a serving base station (BS), and used by the serving BS for channel estimation. In general, a demodulation RS is associated with transmission of uplink (UL) data and/or control signals. In contrast, a channel sounding RS, which is not usually associated with UL data transmission, is typically utilized by a BS to determine UL assignments for an SS. In general, a demodulation RS is used to estimate a UL channel before decoding data transmitted on the UL channel. In this case, the demodulation RS usually has the same bandwidth as the data and occupies the same set of subcarriers as the data.

RSs may be based on Zadoff-Chu (ZC) sequences, which are non-binary unit-amplitude sequences. Typically, ZC sequences have zero dB (decibel) peak-to-average power ratio (PAR)/cubic metric (CM) and ideal cyclic autocorrelation and, as such, ZC sequences are constant amplitude zero autocorrelation (CAZAC) sequences. Cyclic shifted versions of a ZC sequence have low cross-correlation, which usually allows the impact of an interfering signal to be evenly spread in the time-domain, after correlating the received signal with a desired ZC sequence. A ZC sequence may be given by:

$$a_u(k) = \exp\left(-j2\pi u \frac{k(k+1)/2 + qk}{N_G}\right)$$

where u, which ranges from 1 to $N_G-1$, is the ZC sequence index; k ranges from zero to $N_G-1$; $N_G$ is the length of the ZC sequence ($a_u(k)$); and q is any integer (for simplicity q may be set to zero).

When the sequence length $N_G$ is a prime number, $N_G-1$ base sequences can be obtained from the above equation and each sequence has near-optimal cross-correlation with its cyclic shifted version. In various implementations, a size of a UL RB is an even number (e.g., a resource block length $N_P$ may be a multiple of twelve). The difference in size between a ZC RS and a UL resource block (RB) may lead to performance degradation. To mitigate performance degradation due to a difference in sequence length $N_G$ and RB length $N_P$, either truncation or cyclic extension of a prime length sequence can be used to generate an RS of length $N_P$. When truncation is used, the ZC sequence length may be selected as the smallest prime number that is greater than the RB length $N_P$. In this case, the last $N_G-N_P$ samples are truncated to reduce the sequence to the RB length $N_P$. When cyclic extension is used, the ZC sequence length ($N_G$) is selected as the largest prime number that is smaller than the RB length $N_p$. Using this approach, the first $N_p-N_G$ samples are copied and added to a tail of the sequence to extend the ZC sequence to the RB length $N_p$. The generated RS is then applied to reference signal subcarriers of the OFDM modulator (e.g., an inverse fast Fourier transform (IFFT)).

Creating RSs in the manner discussed above provides time-domain RSs that have a range of different cubic metrics (CMs). For example, for a ZC sequence of length eleven (corresponding to one RB with cyclic extension), there are ten different base sequences with CMs that vary from about 0.17 dB to 1.5 dB. As is discussed further below, CM may vary among RSs with different lengths, e.g., RSs with lengths of one RB, two RBs, and three RBs. In general, CMs of some demodulation RSs are even higher than the CM of QPSK (1.2 dB), which may cause performance degradation due to distortion on the RSs. In frequency division duplex (FDD) systems, a channel sounding RS is employed for providing channel state information (CSI) to a scheduler to support channel dependent scheduling on a UL. The scheduler can instruct an SS to transmit a channel sounding RS at a particular time from one or more SS transmit antennas on all or a specified subset of the UL bandwidth. In this manner, channel sounding can be dynamically turned on (or off) and, thus, allow for adjustable spacing in time for overhead management.

A channel sounding RS for different transmit antennas at one SS, or from multiple SSs, can be orthogonal in at least two ways. For example, different sounding waveforms may occupy distinct subcarriers. In this case, orthogonality is achieved in the frequency-domain (i.e., the channel sounding RSs for different transmit antennas at one SS, or from multiple SSs, are sent in a frequency division multiplexed (FDM) fashion). As another example, channel sounding RSs may occupy a common set of subcarriers that are orthogonal in the code-domain. In this case, individual sounding waveforms may be distinguished by a specific cyclic shift of a single reference sequence in the time-domain (i.e., the channel sounding RSs for different transmit antennas at one SS, or from multiple SSs, are sent in a code division multiplexed (CDM) fashion). The channel sounding RSs can be generated by mapping a truncated or a cyclic extended ZC sequence to the set of subcarriers to be occupied by the channel sounding RSs. In case of truncation, the length of the sequence should usually be the smallest prime number that is greater than the length of the RB or RBs ($N_P$). A sounding waveform may be time-multiplexed into a UL subframe such that the channel sounding RS replaces one of the data symbols in the UL subframe. As previously noted, to differentiate SSs (and/or cells), multiple unique RSs are usually implemented within a wireless communication system.

Typically, a length of an RS ($r_u(k)$) is determined by the number of subcarriers that are assigned to an SS for uplink transmission. For example, when an SS is assigned an uplink of one resource block (e.g., twelve subcarriers in the frequency-domain), an RS having a length of twelve may be employed and ten base sequences may be generated, i.e., $r_u(k)$, $1 \leq u \leq 10$, $0 \leq k \leq N_g - 1$, where $N_g$ is a prime number. The demodulation RS ($r_u(k)$) can then be cyclic extended to a length $N_p$, where $N_p$ is, for example, a multiple of twelve and is equal to the number of subcarriers assigned to the SS. It should be appreciated that an RS may be assigned multiple RBs. In this example, a number of orthogonal sequences may be generated from each base sequence using a cyclic shift in the time-domain. The CM for each of the time-domain RSs ($s_u(n)$) may then be calculated by, for example, using:

$$CM = \frac{\left(20\log 10\left(\sqrt{\frac{\sum_{n=0}^{NFFT-1}|s_u(n)|^6}{\left(\sum_{n=0}^{NFFT-1}|s_u(n)|^2\right)^3}}\right) - 1.52\right)}{1.56}$$

With reference to FIG. 1, a diagram 100 illustrates example channel sounding reference signal (RS) assignments for a wide-bandwidth (WB) channel sounding RS and a narrow-bandwidth (NB) channel sounding RS. In this case, the NB channel sounding RS is assigned a width of two RBs and the WB channel sounding RS is assigned a width of eight RBs. In this case, the frequency band (f) includes eight RBs, which may correspond to an entire system bandwidth or a portion of the system bandwidth. With reference to FIG. 2, a table 200 is illustrated that includes two cyclic shift (CS) control bits and one hopping pattern (HP) control bit for an NB RS and three CS control bits for a WB RS. That is, when the RS is a WB RS, the HP control bit is used to designate additional CSs according to the present disclosure. For example, when a WB RS occupies an entire system bandwidth, no control bits are needed to specify an HP. However, it should be appreciated that if the WB RS does not occupy an entire system bandwidth, one or more HP control bits may be employed to specify an HP. In the case where multiple HP control bits are employed, one or more of the HP control bits may function to designate additional CSs when the RSs are WB RSs.

Figure 3:
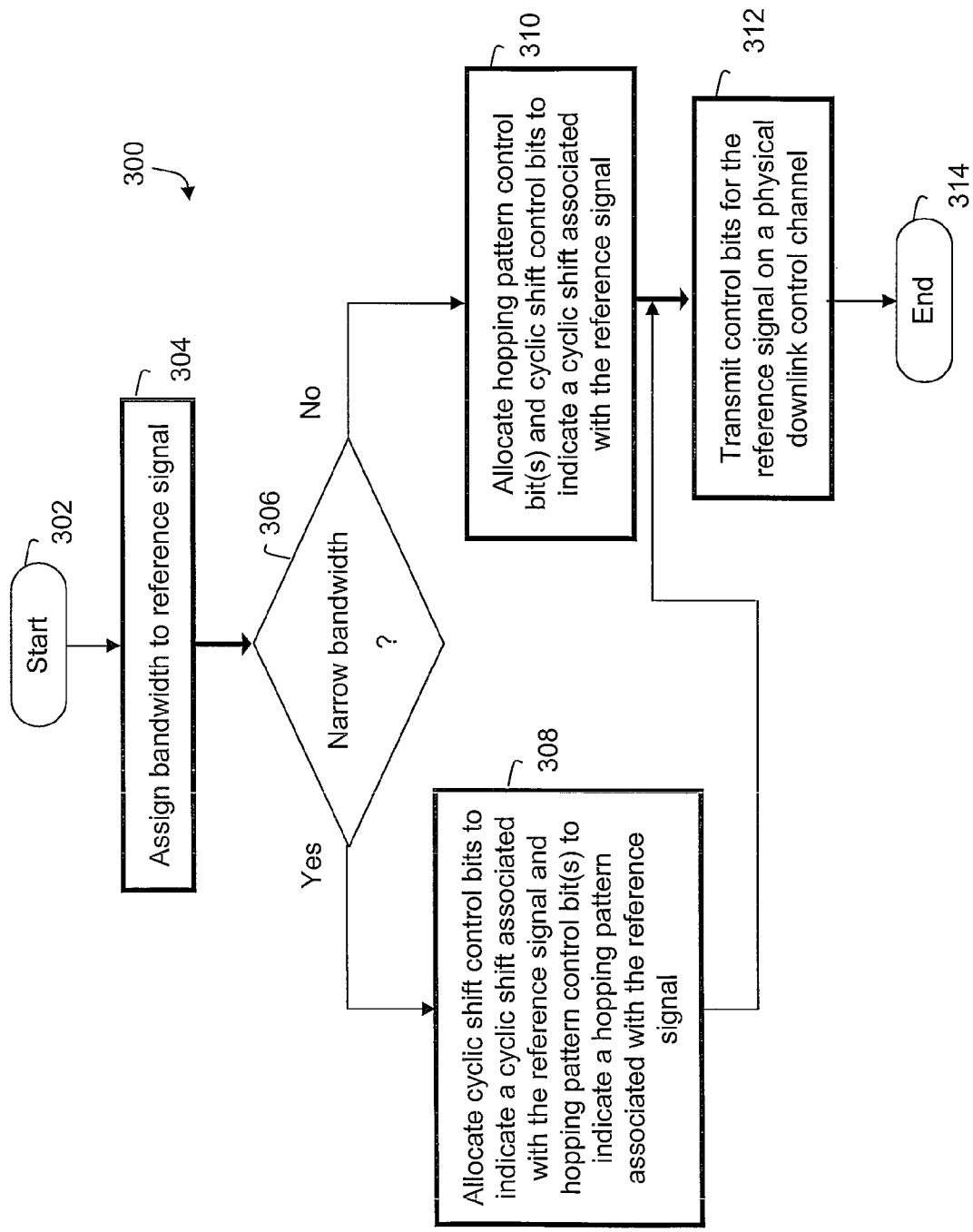
FIG. 3 is a flowchart of an example process that may be employed in a scheduler to assign CS control bits, according to one aspect of the present disclosure.

Moving to FIG. 3, a process 300 that may be employed in a scheduler (e.g., a network-based scheduler of a wireless communication system) to assign CS control bits, according to various aspects of the present disclosure, is illustrated. In block 302, the process 300 is initiated at which point control transfers to decision block 304. In block 304, a bandwidth is assigned to a reference signal based on various criteria. Next, in decision block 306, the scheduler determines whether a narrow-bandwidth (NB) RS or wide-bandwidth (WB) RS have been assigned. If an NB RS is assigned, control transfers from block 306 to block 308. In block 308, the scheduler allocates cyclic shift (CS) control bits to indicate a CS associated with the RS and hopping pattern control bit(s) to indicate an HP associated with the RS. Next, in block 312, the control bits are transmitted to the SS on a physical downlink control channel (PDCCH). Following block 312, control transfers to block 314 where the process 300 terminates and control returns to a calling routine. In block 306, if a WB RS is assigned, control transfers from block 306 to block 310. In block 310, the scheduler allocates hopping pattern (HP) control bits(s) and CS control bits to indicate a CS associated with the RS. In this manner, additional CSs may be specified to served SSs without increasing the total number of control bits employed. Following block 310, control transfers to block 312 and then to block 314.

Figure 4:
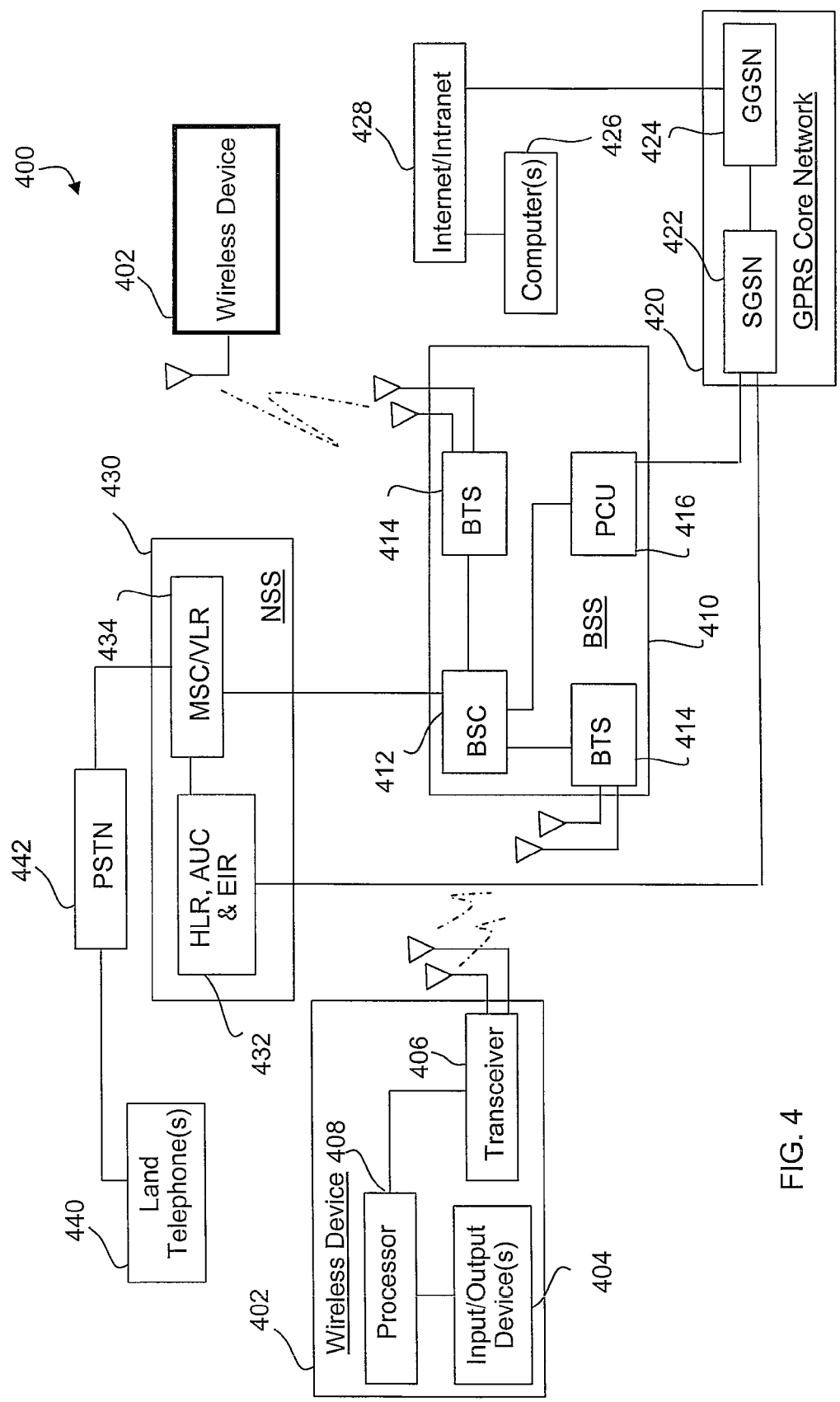
FIG. 4 is a block diagram of an example wireless communication system that may assign CS control bits according to various embodiments of the present disclosure.

With reference to FIG. 4, an example wireless communication system 400 is depicted that includes a plurality of subscriber stations or wireless devices 402, e.g., hand-held computers, personal digital assistants (PDAs), cellular telephones, etc., that may implement communication links according to one or more embodiments of the present disclosure. In general, the wireless devices 402 include a processor 408 (e.g., a digital signal processor (DSP)), a transceiver 406, and one or more input/output devices 404 (e.g., a camera, a keypad, display, etc.), among other components not shown in FIG. 4. As is noted above, according to various embodiments of the present disclosure, a technique is disclosed that increases the number of cyclic shifts (CSs) that may be specified for a WB RS without increasing the number of provisioned control bits. The wireless devices 402 communicates with a base station controller (BSC) 412 of a base station subsystem (BSS) 410, via one or more base transceiver stations (BTS) 414, to receive or transmit voice and/or data and to receive control signals. The BSC 412 may, for example, employ a scheduler for assigning one or more RSs to each of the wireless devices 402. In general, the BSC 412 may also be configured to choose a modulation and coding scheme (MCS) for each of the devices 402, based on channel conditions.

The BSC 412 is also in communication with a packet control unit (PCU) 416, which is in communication with a serving general packet radio service (GPRS) support node (SGSN) 422. The SGSN 422 is in communication with a gateway GPRS support node (GGSN) 424, both of which are included within a GPRS core network 420. The GGSN 424 provides access to computer(s) 426 coupled to Internet/intranet 428. In this manner, the wireless devices 402 may receive data from and/or transmit data to computers coupled to the Internet/intranet 428. For example, when the devices 402 include a camera, images may be transferred to a computer 426 coupled to the Internet/intranet 428 or to another one of the devices 402. The BSC 412 is also in communication with a mobile switching center/visitor location register (MSC/VLR) 434, which is in communication with a home location register (HLR), an authentication center (AUC), and an equipment identity register (EIR) 432. In a typical implementation, the MSC/VLR 434 and the HLR, AUC, and EIR 432 are located within a network and switching subsystem (NSS) 430, which performs various functions for the system 400. The SGSN 422 may communicate directly with the HLR, AUC, and EIR 432. As is also shown, the MSC/VLR 434 is in communication with a public switched telephone network (PSTN) 442, which facilitates communication between wireless devices 402 and land telephone(s) 440.

Accordingly, a number of techniques have been disclosed herein that increase the number of cyclic shifts that may be signaled for a reference signal without increasing a total number of provisioned control bits.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of reference signals employed in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless communication device, comprising:
   assigning, at the wireless communication device, a reference signal bandwidth to a reference signal;
   allocating, at the wireless communication device, a number of cyclic shift control bits associated with the reference signal based on the assigned reference signal bandwidth, wherein the allocated cyclic shift control bits specify a cyclic shift for the reference signal; and
   allocating one or more hopping pattern control bits to indicate a hopping pattern associated with the reference signal when the assigned reference signal bandwidth corresponds to a first bandwidth;
   wherein the allocating cyclic shift control bits further comprises, allocating the cyclic shift control bits and one of the one or more hopping pattern control bits to indicate the cyclic shift associated with the reference signal when the assigned reference signal bandwidth corresponds to a second bandwidth that is wider than the first bandwidth.

2. The method of claim 1, wherein the allocating cyclic shift control bits further comprises allocating the cyclic shift control bits and the one or more hopping pattern control bits to indicate the cyclic shift associated with the reference signal when the assigned reference signal bandwidth corresponds to a second bandwidth that is wider than the first bandwidth.

3. The method of claim 1, wherein the indicated cyclic shift corresponds to an individual one of a plurality of base sequences.

4. The method of claim 2, wherein the maximum length of the individual ones of the plurality of base sequences depends on the reference signal bandwidth.

5. The method of claim 2, wherein the number of individual ones of the plurality of base sequences depends on the reference signal bandwidth.

6. The method of claim 1, further comprising transmitting, to a subscriber station, the allocated cyclic shift control bits on a physical downlink control channel.

7. The method of claim 1, wherein the reference signal is a sounding reference signal.

8. A method of operating a wireless communication device, comprising:
   receiving, at a subscriber station, a reference signal bandwidth assignment for a reference signal;
   receiving, at the subscriber station, a cyclic shift assignment for the reference signal, wherein the cyclic shift assignment is specified by cyclic shift control bits whose number is based on the reference signal bandwidth assignment, and wherein the cyclic shift control bits specify an assigned cyclic shift for the reference signal; and
   receiving one or more hopping pattern control bits, wherein the one or more hopping pattern control bits correspond to an assigned hopping pattern associated with the reference signal when the assigned reference signal bandwidth corresponds to a first bandwidth;
   wherein the cyclic shift control bits and one of the one or more hopping pattern control bits indicate the cyclic shift associated with the reference signal when the assigned reference signal bandwidth corresponds to a second bandwidth that is wider than the first bandwidth.

9. The method of claim 8, wherein the cyclic shift control bits and the one or more hopping pattern control bits indicate the cyclic shift associated with the reference signal when the assigned reference signal bandwidth corresponds to a second bandwidth that is wider than the first bandwidth.

10. The method of claim 8, further comprising: transmitting, from the subscriber station, the reference signal with the assigned cyclic shift.

11. The method of claim 8, further comprising:
transmitting, from the subscriber station, the cyclic shift control bits on a physical uplink control channel.

12. A wireless communication device, comprising:
a scheduler configured to:
assign a reference signal bandwidth to a reference signal;
allocate a number of cyclic shift control bits for the reference signal based on the assigned reference signal bandwidth, wherein the allocated cyclic shift control bits specify a cyclic shift associated with the reference signal;
allocate one or more hopping pattern control bits to indicate a hopping pattern associated with the reference signal when the assigned reference signal bandwidth corresponds to a first bandwidth; and
allocate the cyclic shift control bits and at least one of the one or more hopping pattern control bits to indicate the cyclic shift associated with the reference signal when the assigned reference signal bandwidth corresponds to a second bandwidth that is wider than the first bandwidth.

13. A method of operating a wireless communication device, comprising:
receiving, at the wireless communication device, a reference signal bandwidth assignment for a reference signal;
allocating, at the wireless communication device, a number of cyclic shift control bits associated with the reference signal based on the assigned reference signal bandwidth, wherein the allocated cyclic shift control bits specify a cyclic shift for the reference signal; and
allocating one or more hopping pattern control bits to indicate a hopping pattern associated with the reference signal when the assigned reference signal bandwidth corresponds to a first bandwidth;
wherein the allocating cyclic shift control bits further comprises allocating the cyclic shift control bits and one of the one or more hopping pattern control bits to indicate the cyclic shift associated with the reference signal when the assigned reference signal bandwidth corresponds to a second bandwidth that is wider than the first bandwidth.

14. The method of claim 13, further comprising transmitting, to another wireless communication device, the allocated cyclic shift control bits on a physical uplink control channel.

15. The method of claim 13, wherein the reference signal is a demodulation reference signal.

16. The method of claim 13, wherein the indicated cyclic shift corresponds to an individual one of a plurality of base sequences.

17. The method of claim 16, wherein the maximum length of the individual ones of the plurality of base sequences depends on the reference signal bandwidth.

18. The method of claim 16, wherein the number of individual ones of the plurality of base sequences depends on the reference signal bandwidth.

19. The method of claim 16, wherein a one or more of the plurality of base sequences correspond to Zadoff-Chu sequences.

20. A method of operating a wireless communication device, comprising:
assigning, at the wireless communication device, a reference signal bandwidth for a reference signal;
receiving, at the wireless communication device, a number of cyclic shift control bits associated with the reference signal based on the assigned reference signal bandwidth, wherein the allocated cyclic shift control bits specify a cyclic shift for the reference signal; and
receiving one or more hopping pattern control bits to indicate a hopping pattern associated with the reference signal when the assigned reference signal bandwidth corresponds to a first bandwidth;
wherein the cyclic shift control bits and the one or more hopping pattern control bits indicate the cyclic shift associated with the reference signal when the assigned reference signal bandwidth corresponds to a second bandwidth that is wider than the first bandwidth.

21. The method of claim 20, further comprising receiving, from a subscriber station, the cyclic shift control bits on a physical uplink control channel.

* * * * *